US008946113B2

United States Patent
Moon et al.

(10) Patent No.: US 8,946,113 B2
(45) Date of Patent: Feb. 3, 2015

(54) IRON-MODIFIED NI-BASED PEROVSKITE-TYPE CATALYST, PREPARING METHOD THEREOF, AND PRODUCING METHOD OF SYNTHESIS GAS FROM COMBINED STEAM $CO_2$ REFORMING OF METHANE USING THE SAME

(71) Applicant: Korea Institute of Science and Technology, Seoul (KR)

(72) Inventors: Dong Ju Moon, Seoul (KR); Eun Hyeok Yang, Seoul (KR); Jin Hee Lee, Gwangju (KR); Hyun Jin Kim, Seoul (KR); Byoung Sung Ahn, Seoul (KR); Sang Woo Kim, Seoul (KR); Jae Sun Jung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/909,412

(22) Filed: Jun. 4, 2013

(65) Prior Publication Data

US 2014/0145116 A1    May 29, 2014

(30) Foreign Application Priority Data

Nov. 27, 2012    (KR) ........................ 10-2012-0135230

(51) Int. Cl.
*B01J 21/02*    (2006.01)
*B01J 23/83*    (2006.01)
(Continued)

(52) U.S. Cl.
CPC . *B01J 23/83* (2013.01); *C01B 3/40* (2013.01); *B01J 37/031* (2013.01);
(Continued)

(58) Field of Classification Search
CPC .... C04B 2235/79; B01J 23/745; B01J 23/002
USPC .......... 252/373; 502/303, 306, 314, 315, 316, 502/207, 326, 328, 337, 338, 525
See application file for complete search history.

(56) References Cited

U.S. PATENT DOCUMENTS 7,329,691 B2 *    2/2008    Basile et al. .................. 518/703

FOREIGN PATENT DOCUMENTS

KR    1019980054391 A    12/1998
KR    1020110059306 A    6/2011

OTHER PUBLICATIONS

Choudhary et al. "Oxidative Conversion of Methane to Syngas over LaNiO3 Perovskite with or without Simultaneous Steam and CO2 Reforming Reactions: Influence of Partial Substitution of La and Ni", 1996, Journal of Caralysis, 163, 312-318.*

(Continued)

*Primary Examiner* — Stanley Silverman
*Assistant Examiner* — Syed Iqbal
(74) *Attorney, Agent, or Firm* — Ladas & Parry LLP

(57) ABSTRACT

The present invention relates to an Fe-modified perovskite-type catalyst, a method for preparing same and a method for preparing a synthesis gas by a combined reforming reaction using same. More particularly, it relates to a catalyst for a combined natural gas/steam/carbon dioxide reforming reaction having a perovskite structure with La and Sr introduced at the A site and Ni and Fe introduced at the B site with specific molar ratios and a method for producing a synthesis gas for Fischer-Tropsch synthesis or methanol synthesis using the catalyst by the combined reforming reaction. The catalyst of the present invention exhibits higher carbon dioxide conversion rate, significantly reduced catalyst deactivation caused by carbon deposition and improved long-term catalyst stability and activity, as compared to the existing catalyst for reforming reaction prepared by the impregnation method.

6 Claims, 3 Drawing Sheets

(51) Int. Cl.
  *B01J 23/78* (2006.01)
  *B01J 23/755* (2006.01)
  *B01J 23/745* (2006.01)
  *C01B 3/38* (2006.01)
  *C01B 3/40* (2006.01)
  *B01J 37/03* (2006.01)
  *B01J 35/10* (2006.01)
  *B01J 37/00* (2006.01)
  *C01B 3/00* (2006.01)

(52) U.S. Cl.
  CPC ......... *B01J 35/1014* (2013.01); *B01J 37/0018* (2013.01); *C01B 3/00* (2013.01); *C01B 2203/0233* (2013.01); *C01B 2203/0238* (2013.01); *C01B 2203/1041* (2013.01); *C01B 2203/1058* (2013.01); *C01B 2203/1241* (2013.01); *B01J 2523/00* (2013.01); *Y10S 502/525* (2013.01)
  USPC ........... 502/207; 252/373; 502/303; 502/326; 502/328; 502/337; 502/338; 502/525

(56) References Cited

OTHER PUBLICATIONS

Shao et al. "Modified cellulose adsorption method for the synthesis of conducting perovskite powders for membrane application", 2002, Powder Tcehnology, 122, 26-33.*

DJ Moon; "Effect of Fe on La1-xSrxNi1-yFeyO$_3$ Perovskite Catalysts for Steam CO$_2$ Reforming of Methane", The Korean Institute of Engineers, Fall Symposium 2012; Oct. 24-26 Busan Bexco, 2 pages.

Yun Ju Lee, et al; "Studies on the steam and CO$_2$ reforming of methane for GTL-FPSO applications", Catalysis Today, vol. 174, pp. 31-36, Available online May 26, 2011.

Eun-Hyeok Yang, et al "Preparation and Characterization of Ni-Based Perovskite Catalyst for Steam CO$_2$ Reforming of Methane", Journal of Nanoscience and Nanotechnology, vol. 12, No. 10, pp. 1-4, Oct. 2012.

Catherine Batiot-Dupeyrat, et al; "CO$_2$ reforming of methane over LaNiO$_3$ as precursor material", Catalysis Today, vol. 107-108; pp. 474-480, Availiable online Sep. 8, 2005.

* cited by examiner

IRON-MODIFIED NI-BASED PEROVSKITE-TYPE CATALYST, PREPARING METHOD THEREOF, AND PRODUCING METHOD OF SYNTHESIS GAS FROM COMBINED STEAM $CO_2$ REFORMING OF METHANE USING THE SAME

CROSS-REFERENCE TO RELATED APPLICATIONS

This application claims priority under 35 U.S.C. §119 to Korean Patent Application No. 10-2012-0135230, filed on Nov. 27, 2012, in the Korean Intellectual Property Office, the disclosure of which is incorporated herein by reference in its entirety.

BACKGROUND (a) Technical Field

The present invention relates to an Fe-modified nickel-based perovskite-type catalyst including a lanthanide and an alkaline earth metal and a method for preparing same. The present invention also relates to a method for preparing a synthesis gas by a combined reforming reaction using natural gas, carbon dioxide and water in the presence of the catalyst.

(b) Background Art

With continuing high oil price, limited resources and concerns on environmental pollution, the gas to liquids (GTL) process of producing clean synthetic fuels from natural gas has attracted attentions for decades. It is expected that the synthetic oil produced from the GTL process will be an ecofriendly and economical alternative to the fossil fuel for decades to come. Also, the GTL-floating production, storage and offloading (FPSO) technique of producing synthetic oil from an offshore stranded gas field is attracting attentions (Korean Patent Publication No. 10-2011-0059306).

In the production of synthetic oil from the Fischer-Tropsch reaction, a synthesis gas including hydrogen and carbon monoxide is supplied as a reactant. An ideal $H_2/CO$ ratio of the synthesis gas for the Fischer-Tropsch reaction is 2. The synthesis gas is produced by steam reforming, carbon dioxide reforming, partial oxidation reforming using oxygen, autothermal reforming combining steam reforming and partial oxidation reforming, tri-reforming using carbon dioxide, oxygen and steam, and so forth. Reaction schemes for the respective reforming reactions are as follows.

Carbon dioxide reforming reaction (CDR)

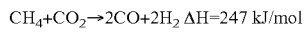

Steam reforming reaction (SR)

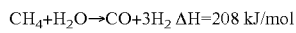

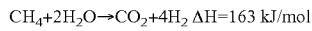

Combined steam carbon dioxide reforming reaction (SCR)=SR+CDR

Partial oxidation reaction (POX)

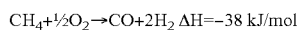

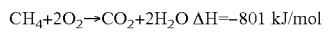

Autothermal reforming reaction (ATR)=SR+PDX
Tri-reforming reaction=SR+PDX+CDR

The carbon dioxide reforming reaction often suffers from catalyst poisoning due to carbon deposition and the produced synthesis gas has an $H_2/CO$ ratio of approximately 1. In the steam reforming reaction, a synthesis gas is produced by supplying steam instead of carbon dioxide in order to prevent the carbon deposition frequently occurring in the carbon dioxide reforming reaction. Although the carbon deposition is suppressed as compared to the carbon dioxide reforming reaction, supply of excess steam is necessary. Further, since the $H_2/CO$ ratio of the produced synthesis gas is approximately 3, hydrogen has to be partially removed for use in the Fischer-Tropsch reaction. Although the partial oxidation, autothermal reforming and tri-reforming reactions produce a synthesis gas with an $H_2/CO$ ratio of approximately 2, the initial investment is expensive since an oxygen plant for supplying oxygen is necessary. The combined reforming reaction using carbon dioxide and steam can produce a synthesis gas with an $H_2/CO$ ratio ranging from 1 to 3 through control of the compositional ratio of reactants. The reaction is also advantageous in that an oxygen plant for supplying oxygen is unnecessary and it is less sensitive to carbon deposition than the carbon dioxide reforming reaction.

In general, nickel-based catalysts are commonly used in the reforming reaction. Although noble metal-based catalysts exhibit better performance in terms of catalytic activity or catalyst poisoning, the nickel-based catalysts are preferred for economic reasons. Accordingly, development of a catalyst for reforming reaction with superior thermal stability and mechanical strength in addition to resistance to carbon deposition is necessary. In this regard, a lot of researches are actively under way to reduce catalyst sintering and carbon deposition.

Korean Patent Publication No. 10-1998-0054391 describes that a $Ni/Al_2O_3$ catalyst for carbon dioxide reforming prepared by a coprecipitation method exhibits better activity for the carbon dioxide reforming reaction than a catalyst in which nickel is supported on an alumina support by the impregnation method. Also, it is reported that a catalyst in which nickel is supported on a mesoporous molecular sieve (ZSM-5, MCM-41, KIT-1) by the impregnation method exhibits good activity for the carbon dioxide reforming reaction. As for the combined steam carbon dioxide reforming reaction, it is reported that a Ni/MgO catalyst exhibits better activity and resistance to carbon deposition than a $Ni/Al_2O_3$ catalyst [*Catalysis Today*, 174 (2011), 31]. In particular, a perovskite-type oxide has a redox property and it is possible to prepare oxides containing various elements by introducing other metals into the sites A and B. It is reported that a $LaNiO_3$ perovskite-type catalyst exhibits good activity for the carbon dioxide reforming reaction [*Catalysis Today*, 107 (2005), 474]. It was also confirmed in the previous study of the inventors of the present invention that $LaNiO_3$ and $La_{1-x}Sr_x-NiO_3$ (x=0-0.5) perovskite-type catalysts exhibit good activity for the combined steam carbon dioxide reforming reaction [Int. Conference on NanoSci. and NanoTech. (2012), in press]. Thus, the present invention is directed to providing a catalyst having good activity for the combined steam carbon dioxide reforming reaction, which is prepared by introducing various materials into perovskite having an $ABO_3$ structure.

Throughout the specification, a number of publications and patent documents are referred to and cited. The disclosure of the cited publications and patent documents is incorporated herein by reference in its entirety to more clearly describe the state of the related art and the present invention.

SUMMARY

In general, the reforming reaction exhibits good conversion rate at high temperature and low pressure. The present invention is directed to developing a catalyst which exhibits good activity under high-pressure condition and is resistant to deactivation due to sintering of active metal and carbon deposition on the catalyst during reforming reaction, which is the main problem of the existing nickel-based catalyst for reforming reaction. The inventors of the present invention have prepared a nickel-based $La_{1-x}A'_xB_{1-x}B'_yO_3$ perovskite-type catalyst having a composition optimized for combined steam carbon dioxide reforming reaction, wherein a perovskite including a lanthanide metal A and a transition metal B is replaced with an alkaline earth metal and another transition metal. This catalyst has better thermal stability than the existing catalyst for combined steam carbon dioxide reforming reaction and, if the catalyst is reduced before the reaction, nickel may be highly dispersed on the catalyst surface. The catalyst maintains catalytic activity even under high-pressure condition and exhibits superior catalytic activity as compared to the existing catalyst.

In an aspect, the present invention provides an Fe-modified nickel-based perovskite-type catalyst represented by Chemical Formula 1:

  [Chemical Formula 1]

wherein A is an alkaline earth metal, B is at least one group 8 transition metal, $0 \leq x \leq 0.2$ and $0 \leq y \leq 1$.

In another aspect, the present invention provides a method for preparing the Fe-modified nickel-based perovskite-type catalyst represented by Chemical Formula 1, including:

preparing a perovskite precursor solution by dissolving a lanthanum precursor, an alkaline earth metal precursor, a nickel precursor and an iron precursor in water such that the molar ratio of Chemical Formula 1 is satisfied;

adding cellulose powder to the perovskite precursor solution while heating;

adjusting pH of the precursor solution by adding an EDTA-$NH_3 \cdot H_2O$ solution; and concentrating the precursor solution by heating and drying and sintering same.

In another aspect, the present invention provides a method for preparing a synthesis gas by a combined steam carbon dioxide reforming reaction in the presence of the Fe-modified nickel-based perovskite-type catalyst represented by Chemical Formula 1.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION

Figure 1:
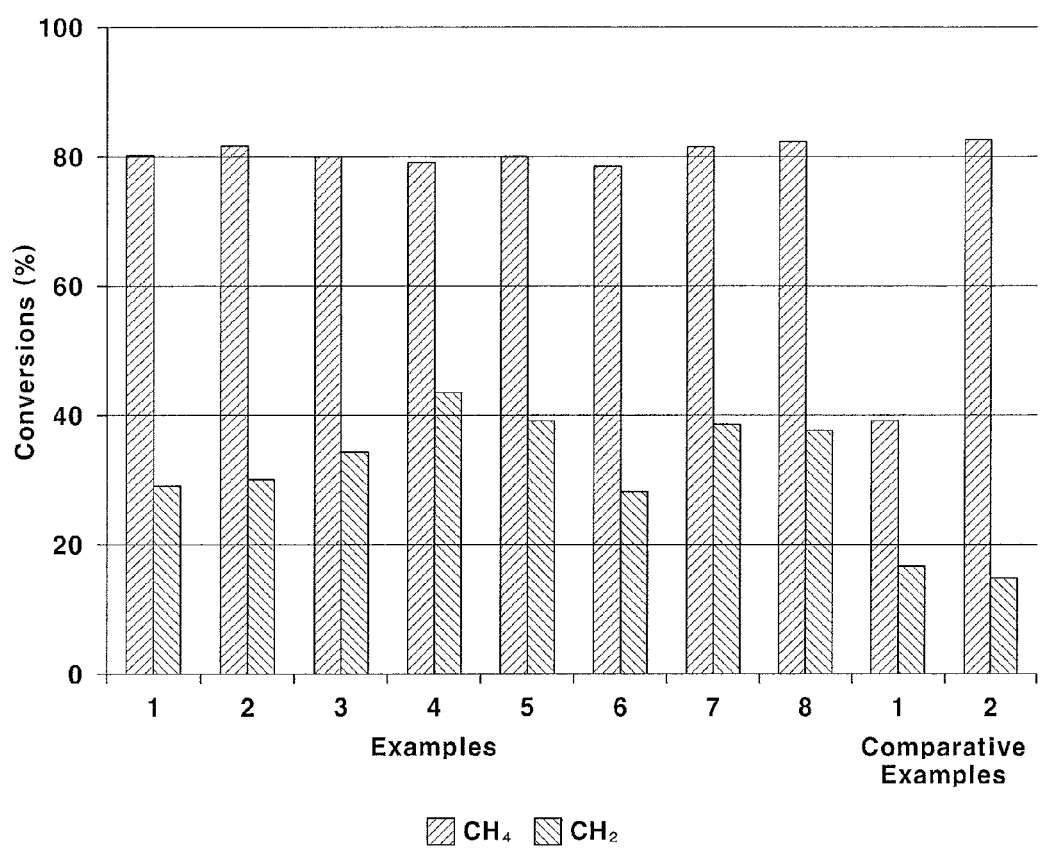
FIG. 1 shows methane and carbon dioxide conversion rates of Examples and Comparative Examples.
Figure 2:
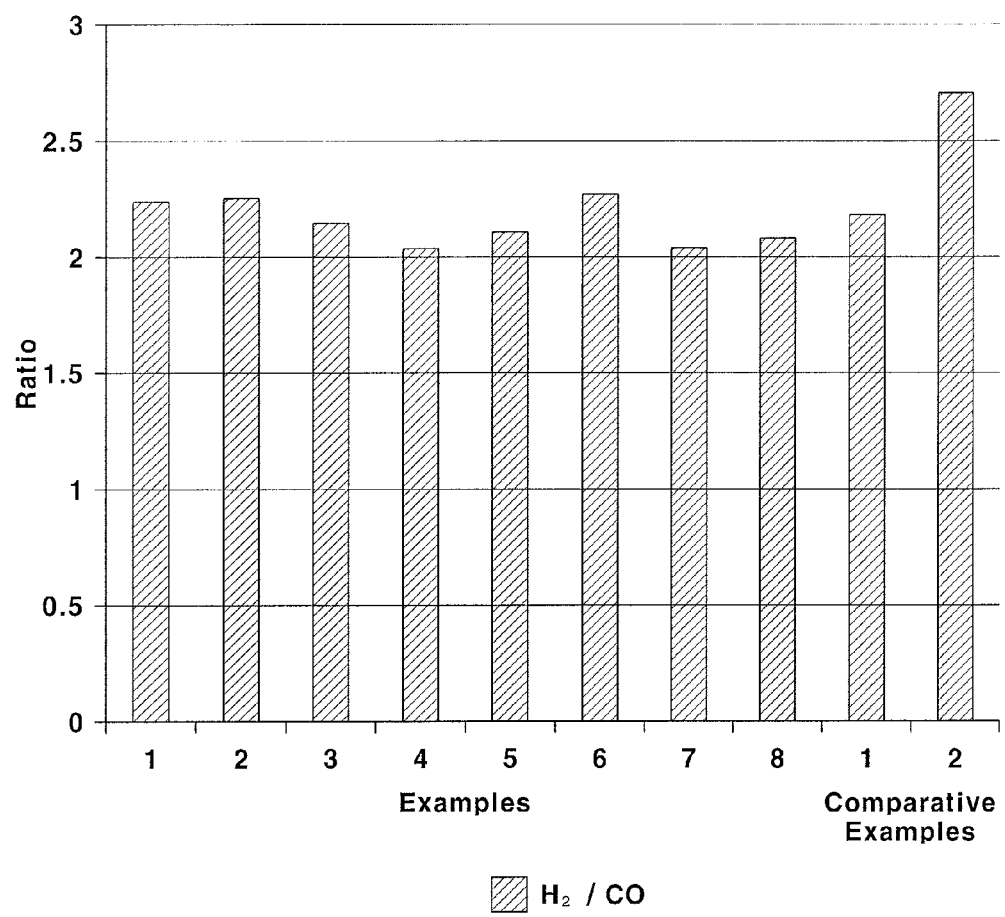
FIG. 2 shows $H_2$/CO ratio of synthesis gases produced in Examples and Comparative Examples.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Perovskite has an $ABO_3$ structure, with A being a rare earth metal such as lanthanum, neodymium, samarium, etc. and B being a group 8 transition metal such as nickel, iron, cobalt, etc. It is known that vacant oxygen sites are formed depending on the valence of each metal ion, thus resulting in change in physical and chemical properties of a catalyst. Perovskite has a small specific surface area of around 10 $m^2g^{-1}$ because it does not have a porous structure. During the formation of the perovskite structure, the specific surface area of the catalyst decreases as the sintering temperature is increased. Although a catalyst is prepared by introducing nickel into the perovskite structure as an active metal to compensate for the low surface area of perovskite, reduction under hydrogen atmosphere is necessary to achieve catalytic activity. During the reduction process, the perovskite structure may collapse. Accordingly, in the present invention, Fe is introduced into the B site to improve the stability of the perovskite structure and thus to maintain the perovskite structure even after the reduction.

An Fe-modified nickel-based perovskite-type catalyst according to the present invention is prepared as follows.

Precursors of lanthanum, an alkaline earth metal, nickel and iron are dissolved in distilled water to prepare a perovskite precursor solution such that the molar ratio of Chemical Formula 1 is satisfied. Each precursor may be one or more selected from nitrate, acetonate, acetate, halide and acetylacetonate. Specifically, nitrate may be used. The perovskite precursor solution is stirred for 1 hour.

Cellulose powder is added to the perovskite precursor solution. The cellulose is added in such an amount that the mass ratio is 1:1 based on the total metals included in the perovskite precursor solution. The cellulose is treated with concentrated nitric acid for 1 hour in advance to remove organic matter on the surface. After addition of the cellulose, the solution is stirred at 50° C. for 1 hour.

A chelating agent is added to the precursor solution. Oxalic acid, EDTA, citric acid, etc. may be used as the chelating agent. In the present invention, EDTA dissolved in ammonia solution is used. The EDTA.$NH_4OH$ solution is quickly mixed with the precursor solution and pH is adjusted to 4-6 using ammonia solution. Subsequently, the pH-adjusted precursor solution is stirred at 50° C. for 3-12 hours. The stirred precursor solution is concentrated by evaporating water at 90° C. The concentrated mixture solution is dried in an oven set at 110° C. for 12-24 hours. The dried product is calcined at 500-800° C. for 3-5 hours. If the calcination is performed at 500° C. or lower, the perovskite structure is not formed well. And, if the calcination is performed at 800° C. or above, the specific surface area of the catalyst becomes too small. Hence, it is recommended to maintain the above calcination temperature range.

The present invention also provides a method for preparing a synthesis gas by a combined reforming reaction using natural gas, steam and carbon dioxide in the presence of the Fe-modified nickel-based perovskite-type catalyst represented by Chemical Formula 1.

Since the natural gas mainly consists of methane, methane is used as a substance mimicking natural gas in the examples described below. A combined natural gas/steam/carbon dioxide reforming reaction is carried out using a tubular fixed-bed reaction apparatus. As a pretreatment process before the reaction, the $La_{1-x}Sr_xNi_{1-x}Fe_xO_3$ catalyst is packed in the reactor and reduced using hydrogen diluted with nitrogen. It is recommended to use diluted hydrogen during the reduction since sintering of the active metal may occur if pure hydrogen is used. Then, the reactants methane, steam and carbon dioxide are injected into the reactor at a molar ratio of 1:1-2:0-1.

The combined natural gas/steam/carbon dioxide reforming reaction is performed for 12 hours at a reaction pressure of 21 bar, a reaction temperature of 800-900° C. and a reactant space velocity of 3000 h$^{-1}$ and then catalytic activity is measured. Methane and carbon dioxide conversion rates and H$_2$/CO ratio of produced synthesis gases for the respective catalysts are given in Table 1.

EXAMPLES

The present invention will be described in more detail through examples. The following examples are for illustrative purposes only and it will be apparent to those skilled in the art not that the scope of this invention is not limited by the examples.

Examples

Example 1

Preparation of $La_{0.95}Sr_{0.05}NiO_3$ Catalyst 8.2 g of $La(NO_3)_3.6H_2O$, 0.2 g of $Sr(NO_3)_2$ and 5.9 g of $Ni(NO_3)_2.6H_2O$ are dissolved in 200 mL of distilled water and stirred for 1 hour. 3.8 g cellulose powder treated with nitric acid is added to the resulting precursor solution. After raising temperature to 50° C., the precursor solution is stirred for 1 hour such that the cellulose is dispersed well in the precursor solution. 13.7 g of EDTA is dissolved in an ammonia solution diluted with distilled water and then added to the stirred precursor solution. Then, pH is adjusted to 5 by further adding ammonia. The pH-adjusted precursor solution is stirred at 50° C. for 3 hours. After the stirring, water is evaporated from the precursor solution at 90° C. After the solution is sufficiently concentrated, the solution is dried in an oven at 110° C. for 24 hours and sintered at 800° C. for 3 hours under air atmosphere to prepare a catalyst. The prepared catalyst has a composition of $La_{0.95}Sr_{0.05}NiO_3$ and a surface area of 6 m$^2$/g.

Example 2

Preparation of $La_{0.95}Sr_{0.05}Ni_{0.9}Fe_{0.1}O_3$ Catalyst

A catalyst is prepared in the same manner as in Example 1, except for using 5.3 g of $Ni(NO_3)_2.6H_2O$ and 0.8 g of $Fe(NO_3)_3.9H_2O$. The prepared catalyst has a composition of $La_{0.95}Sr_{0.05}Ni_{0.9}Fe_{0.1}O_3$ and a surface area of 3.5 m$^2$/g.

Example 3

Preparation of $La_{0.95}Sr_{0.05}Ni_{0.7}Fe_{0.3}O_3$ Catalyst

A catalyst is prepared in the same manner as in Example 1, except for using 4.1 g of $Ni(NO_3)_2.6H_2O$ and 2.4 g of $Fe(NO_3)_3.9H_2O$. The prepared catalyst has a composition of $La_{0.95}Sr_{0.05}Ni_{0.7}Fe_{0.3}O_3$ and a surface area of 3.7 m$^2$/g.

Example 4

Preparation of $La_{0.95}Sr_{0.05}Ni_{0.5}Fe_{0.5}O_3$ Catalyst

A catalyst is prepared in the same manner as in Example 1, except for using 2.9 g of $Ni(NO_3)_2.6H_2O$ and 4.0 g of $Fe(NO_3)_3.9H_2O$. The prepared catalyst has a composition of $La_{0.95}Sr_{0.05}Ni_{0.5}Fe_{0.5}O_3$ and a surface area of 5.1 m$^2$/g.

Example 5

Preparation of $La_{0.95}Sr_{0.05}Ni_{0.3}Fe_{0.7}O_3$ Catalyst

A catalyst is prepared in the same manner as in Example 1, except for using 1.8 g of $Ni(NO_3)_2.6H_2O$ and 5.6 g of $Fe(NO_3)_3.9H_2O$. The prepared catalyst has a composition of $La_{0.95}Sr_{0.05}Ni_{0.3}Fe_{0.7}O_3$ and a surface area of 5.4 m$^2$/g.

Example 6

Preparation of $La_{0.95}Sr_{0.05}Ni_{0.1}Fe_{0.9}O_3$ Catalyst

A catalyst is prepared in the same manner as in Example 1, except for using 0.6 g of $Ni(NO_3)_2.6H_2O$ and 7.2 g of $Fe(NO_3)_3.9H_2O$. The prepared catalyst has a composition of $La_{0.95}Sr_{0.05}Ni_{0.1}Fe_{0.9}O_3$ and a surface area of 5.5 m$^2$/g.

Example 7

Preparation of $La_{0.9}Sr_{0.1}Ni_{0.3}Fe_{0.7}O_3$ Catalyst

A catalyst is prepared in the same manner as in Example 1, except for sintering the catalyst at 600° C. and using 7.9 g of $La(NO_3)_3.6H_2O$, 0.4 g of $Sr(NO_3)_2$, 1.8 g of $Ni(NO_3)_2.6H_2O$ and 5.7 g of $Fe(NO_3)_3.9H_2O$. The prepared catalyst has a composition of $La_{0.9}Sr_{0.1}Ni_{0.3}Fe_{0.7}O_3$ and a surface area of 11.7 m$^2$/g.

Example 8

Preparation of $La_{0.8}Sr_{0.2}Ni_{0.3}Fe_{0.7}O_3$ Catalyst

A catalyst is prepared in the same manner as in Example 1, except for sintering the catalyst at 600° C. and using 7.1 g of $La(NO_3)_3.6H_2O$, 0.9 g of $Sr(NO_3)_2$, 1.8 g of $Ni(NO_3)_2.6H_2O$ and 5.7 g of $Fe(NO_3)_3.9H_2O$. The prepared catalyst has a composition of $La_{0.8}Sr_{0.2}Ni_{0.3}Fe_{0.7}O_3$ and a surface area of 26.7 m$^2$/g.

Comparative Example 1

Preparation of $La_{0.95}Sr_{0.05}FeO_3$ Catalyst

A catalyst is prepared in the same manner as in Example 1, except for introducing Fe only to the B site using 8.1 g of $Fe(NO_3)_3.9H_2O$. The prepared catalyst has a composition of $La_{0.95}Sr_{0.05}FeO_3$ and a surface area of 3.7 m$^2$/g.

Comparative Example 2

Preparation of 20 wt % Ni/$\gamma$-$Al_2O_3$ Catalyst

For comparison of performance with the catalysts prepared according to the present invention, a commonly used reforming catalyst Ni/$\gamma$-$Al_2O_3$ is prepared by an impregnation method. 3.8 g of $Ni(NO_3)_2.6H_2O$ is dissolved well in 1 mL of distilled water. About 0.5 mL of the resulting precursor solution is coated on 3 g of $\gamma$-$Al_2O_3$ by an impregnation method. This procedure is repeated until 20 wt % of Ni is supported. Thus obtained catalyst is dried overnight in an oven at 60° C. and then sintered at 550° C. under atmospheric condition. The prepared 20 wt % Ni/$\gamma$-$Al_2O_3$ catalyst has a surface area of 95.9 m$^2$/g.

Methane and carbon dioxide conversion rates and H$_2$/CO ratio of produced synthesis gases for the respective catalysts are given in Table 1.

TABLE 1

| | Catalyst | Reaction temperature (° C.) | CH$_4$ conversion rate (%) | CO$_2$ conversion rate (%) | H$_2$/CO ratio of synthesis gas | Surface area (m$^2$/g) |
|---|---|---|---|---|---|---|
| Ex. 1 | La$_{0.95}$Sr$_{0.05}$NiO$_3$ | 900 | 80.3 | 29.0 | 2.24 | 6 |
| 2 | La$_{0.95}$Sr$_{0.05}$Ni$_{0.9}$Fe$_{0.1}$O$_3$ | 900 | 81.9 | 30.1 | 2.26 | 3.5 |
| 3 | La$_{0.95}$Sr$_{0.05}$Ni$_{0.7}$Fe$_{0.5}$O$_3$ | 900 | 80.0 | 34.2 | 2.15 | 3.7 |
| 4 | La$_{0.95}$Sr$_{0.05}$Ni$_{0.5}$Fe$_{0.5}$O$_3$ | 900 | 79.2 | 43.5 | 2.04 | 5.1 |
| 5 | La$_{0.95}$Sr$_{0.05}$Ni$_{0.3}$Fe$_{0.7}$O$_3$ | 900 | 79.7 | 39.1 | 2.10 | 5.4 |
| 6 | La$_{0.95}$Sr$_{0.05}$Ni$_{0.1}$Fe$_{0.9}$O$_3$ | 900 | 78.5 | 28.2 | 2.28 | 5.5 |
| 7 | La$_{0.9}$Sr$_{0.1}$Ni$_{0.3}$Fe$_{0.7}$O$_3$ | 850 | 81.6 | 38.7 | 2.04 | 11.7 |
| 8 | La$_{0.8}$Sr$_{0.2}$Ni$_{0.3}$Fe$_{0.7}$O$_3$ | 850 | 82.6 | 37.7 | 2.08 | 26.7 |
| Comp. Ex. 1 | La$_{0.95}$Sr$_{0.05}$FeO$_3$ | 900 | 39.1 | 16.6 | 2.18 | 3.7 |
| 2 | 20 wt % Ni/—Al$_2$O$_3$ | 900 | 82.8 | 14.8 | 2.71 | 95.9 |

As seen from Table 1, the perovskite-type catalysts exhibit higher CO$_2$ conversion rate than the Ni/γ-Al$_2$O$_3$ catalyst prepared by the impregnation method although the BET surface area is relatively smaller.

Test Example

Each of the catalysts prepared in Examples 1, 2, 3, 4, 5 and 6 was packed in a tubular fixed-bed reactor and reduced at 700° C. for 1 hour using 10% hydrogen diluted with nitrogen before performing reaction. Reactants were supplied to the reactor with a molar ratio of methane:water:carbon dioxide=1:1.63:0.6 and a reactant space velocity of 3000 h$^{-1}$ using a mass flow controller. The composition of the produced gas was analyzed by gas chromatography using a Carbosphere column and a thermal conductivity detector. According to Le Chatelier's principle, the equilibrium conversion rate of the reforming reaction is higher in general as the temperature is higher and the pressure is lower. When the combined reforming reaction was carried out for 12 hours under high pressure, methane conversion rate was about 80%. Carbon dioxide conversion rate, which increased and then decreased with the Fe content, was about 30-40%, which was about 3 times higher than that of the 20 wt % Ni/γ-Al$_2$O$_3$ catalyst. Also, as seen from Table 1, all the catalysts of Examples produced synthesis gases appropriate for the Fischer-Tropsch reaction with H$_2$/CO ratios of 1.8-2.2. In particular, the La$_{0.95}$Sr$_{0.05}$Ni$_{0.3}$Fe$_{0.7}$O$_3$, La$_{0.95}$Sr$_{0.05}$Ni$_{0.3}$Fe$_{0.7}$O$_3$, La$_{0.9}$Sr$_{0.3}$Ni$_{0.3}$Fe$_{0.7}$O$_3$ and La$_{0.8}$Sr$_{0.2}$Ni$_{0.3}$Fe$_{0.7}$O$_3$ catalysts exhibited good activities and H$_2$/CO ratios close to 2.

Figure 3:
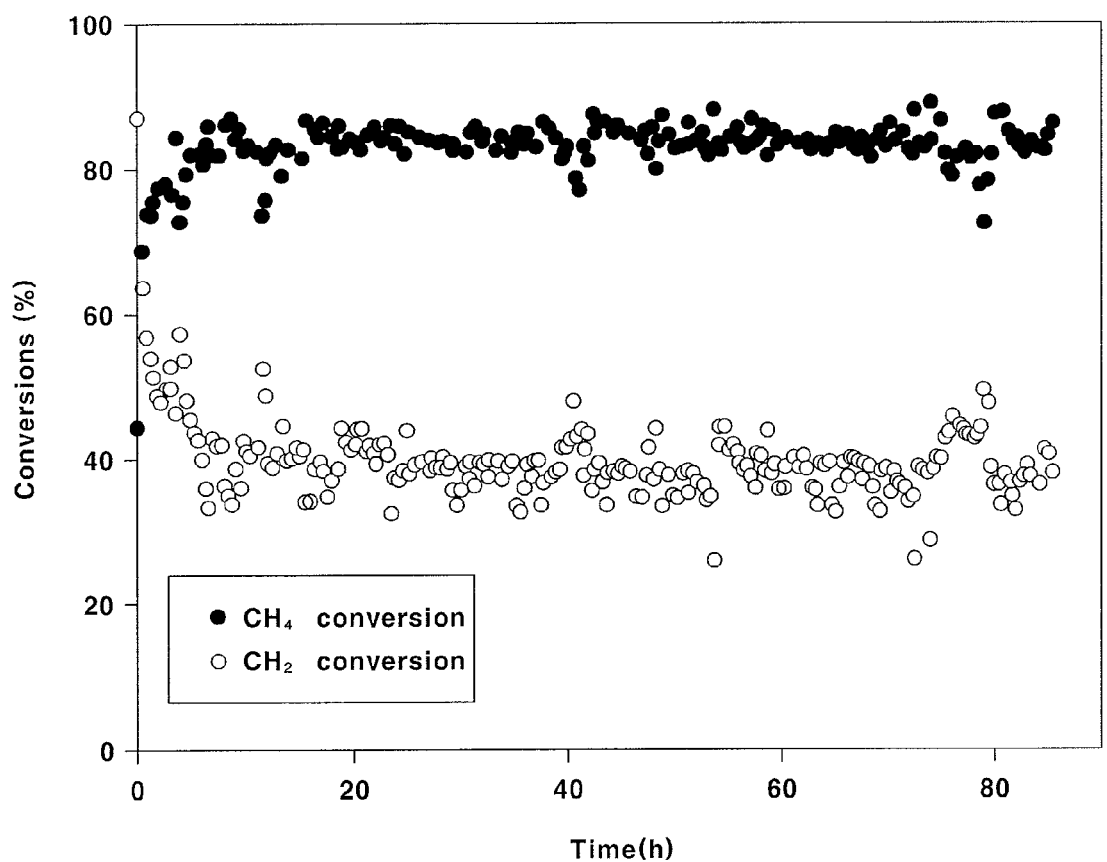
FIG. 3 shows a result of long-term SCR reaction using a catalyst prepared in Example 3.

Also, as seen from FIG. 3, the catalyst of Example 4 exhibits long-term reaction stability.

The Fe-modified nickel-based perovskite-type catalyst of the present invention, when used for the combined steam carbon dioxide reforming reaction, can reduce carbon deposition, exhibit good catalytic activity while maintaining the perovskite structure at high temperature and produce a synthesis gas appropriate for Fischer-Tropsch synthesis. Further, the catalyst exhibits higher nickel dispersibility than the existing catalyst for steam reforming of methane prepared by the impregnation method.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. An Fe-modified nickel-based perovskite-type catalyst represented by Chemical Formula 1:

La$_{1-x}$A$_x$Ni$_{1-y}$B$_y$O$_3$     [Chemical Formula 1]

wherein A is an alkaline earth metal, B is Fe as a transition metal, 0≤x≤0.2 and 0<y<1.

2. A method for preparing an Fe-modified nickel-based perovskite-type catalyst represented by Chemical Formula 1, comprising:
preparing a perovskite precursor solution by dissolving a lanthanum precursor, an alkaline earth metal precursor, a nickel precursor and an iron precursor in water such that the molar ratio of Chemical Formula 1 is satisfied;
adding cellulose to the perovskite precursor solution with a mass ratio of 1:1 based on the metals included in the perovskite precursor solution;
adjusting pH of the cellulose-added precursor solution by mixing with EDTA-NH$_4$.OH; and
drying the precursor solution and calcinating a dried product:

La$_{1-x}$A$_x$Ni$_{1-y}$B$_y$O$_3$     [Chemical Formula 1]

wherein A is an alkaline earth metal, B is Fe as a transition metal, 0≤x≤0.2 and 0y<1.

3. The method for preparing an Fe-modified nickel-based perovskite-type catalyst according to claim 2, wherein said calcination is performed at 500-900° C.

4. A method for preparing a synthesis gas by a combined natural gas/steam/carbon dioxide reforming reaction in the presence of an Fe-modified nickel-based perovskite-type catalyst represented by Chemical Formula 1:

La$_{1-x}$A$_x$Ni$_{1-y}$B$_y$O$_3$     [Chemical Formula 1]

wherein A is an alkaline earth metal, B is Fe as a transition metal, 0≤x≤0.2 and 0<y<1.

5. The method for preparing a synthesis gas by a combined natural gas/steam/carbon dioxide reforming reaction according to claim 4, wherein the combined reforming reaction is performed at a reaction pressure 21-30 bar, a reaction temperature of 800-900° C. and a reactant space velocity of 3000-10000 h$^{-1}$.

6. The method for preparing a synthesis gas by a combined natural gas/steam/carbon dioxide reforming reaction according to claim 4, comprising a pretreatment process, wherein the Fe-modified nickel-based perovskite-type catalyst represented by Chemical Formula 1 is packed in a reactor and reduced using hydrogen diluted with nitrogen.

* * * * *